(12) United States Patent
Baitz et al.

(10) Patent No.: US 9,965,927 B2
(45) Date of Patent: May 8, 2018

(54) CHECKOUT SYSTEM ASSEMBLY WITH GOODS SEPARATOR DETECTION

(71) Applicant: WINCOR NIXDORF INTERNATIONAL GMBH, Paderborn (DE)

(72) Inventors: Guenter Baitz, Berlin (DE); Marco Fischer, Berlin (DE); Oliver Schaefer, Berlin (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days. days.

(21) Appl. No.: 15/141,737

(22) Filed: Apr. 28, 2016

(65) Prior Publication Data

US 2016/0321877 A1 Nov. 3, 2016

(30) Foreign Application Priority Data

Apr. 29, 2015 (EP) ..................... 15165711

(51) Int. Cl.
*G07G 1/00* (2006.01)
*A47F 9/04* (2006.01)
*G06K 7/14* (2006.01)
*G06K 19/06* (2006.01)
(Continued)

(52) U.S. Cl.
CPC ............. *G07G 1/009* (2013.01); *A47F 9/048* (2013.01); *G06K 7/1408* (2013.01); *G06K 19/06028* (2013.01); *G06K 19/06037* (2013.01); *G06K 19/07758* (2013.01); *G07D 7/0034* (2017.05); *G07G 1/0036* (2013.01); *G07G 1/0045* (2013.01); *A47F 2009/041* (2013.01)

(58) Field of Classification Search
None
See application file for complete search history.

(56) References Cited

U.S. PATENT DOCUMENTS 6,315,199 B1 11/2001 Ito et al.
8,733,643 B2 5/2014 Svetal et al.
2006/0261157 A1 11/2006 Ostrowski et al.
(Continued)

FOREIGN PATENT DOCUMENTS

CH 526290 A 8/1972
DE 69233430 T2 6/2006
(Continued)

*Primary Examiner* — Kristy A Haupt
(74) *Attorney, Agent, or Firm* — Black, McCuskey, Souers & Arbaugh, LPA

(57) ABSTRACT

The invention relates to a POS system arrangement with a transport belt device with at least one belt portion which for the transport of the goods present thereon can be put into a feed movement along a goods feed path, wherein the goods along the goods feed path are separable from each other by at least one goods divider, and a goods detection device for detecting goods transported by means of the transport belt device. There is provided at least one sensor device arranged at a distance from the goods detection device along the goods feed path with a sensor and a detection area, wherein the sensor device is configured to detect by means of the sensor whether the goods divider is present in the detection area, and a control device which is configured to control the feed movement of the belt portion of the transport belt device.

15 Claims, 11 Drawing Sheets

(51) Int. Cl.
*G06K 19/077* (2006.01)
*G07D 7/00* (2016.01)

(56) References Cited

U.S. PATENT DOCUMENTS

| | | | |
|---|---|---|---|
| 2012/0187191 A1* | 7/2012 | Olmstead | G07G 1/0045 235/462.13 |
| 2012/0187195 A1 | 7/2012 | Actis et al. | |
| 2014/0001266 A1* | 1/2014 | Collins, Jr. | G06K 7/10861 235/462.13 |
| 2014/0129362 A1* | 5/2014 | Marquis | G07G 1/0036 705/23 |

FOREIGN PATENT DOCUMENTS

| | | |
|---|---|---|
| DE | 202008003738 U1 | 10/2008 |
| DE | 102008010642 A1 | 8/2009 |
| EP | 1306036 A1 | 5/2003 |
| GB | 1 354 743 A | 6/1974 |
| WO | 2009103410 A1 | 8/2009 |

* cited by examiner

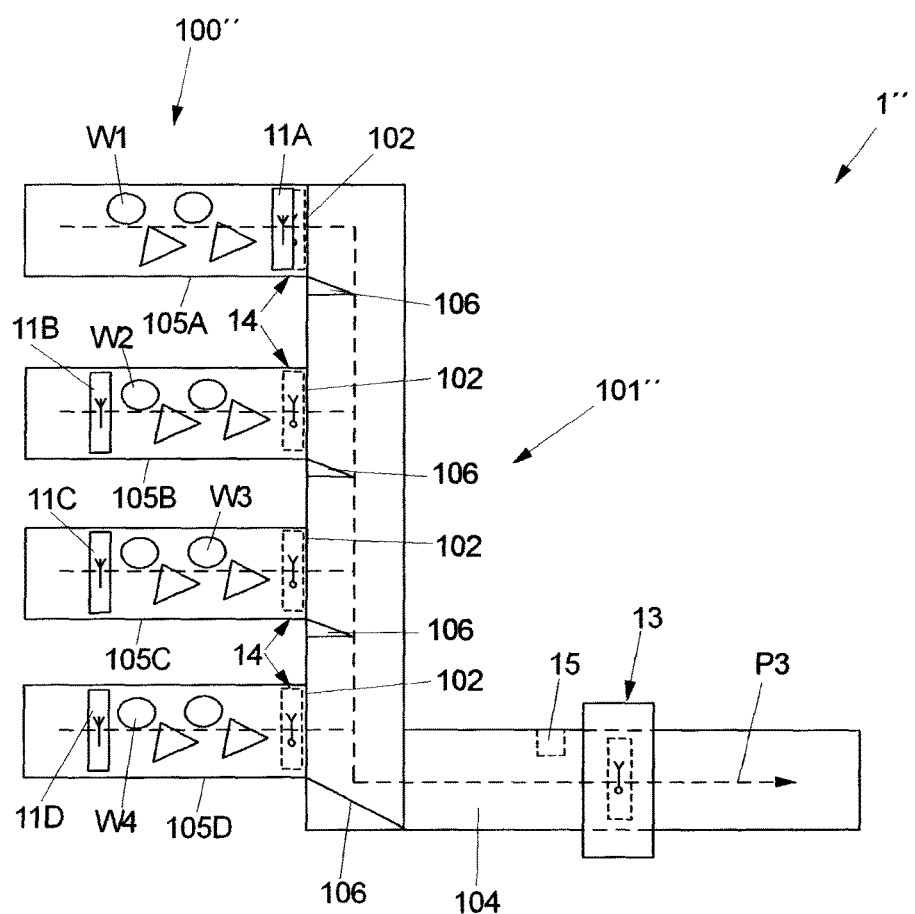

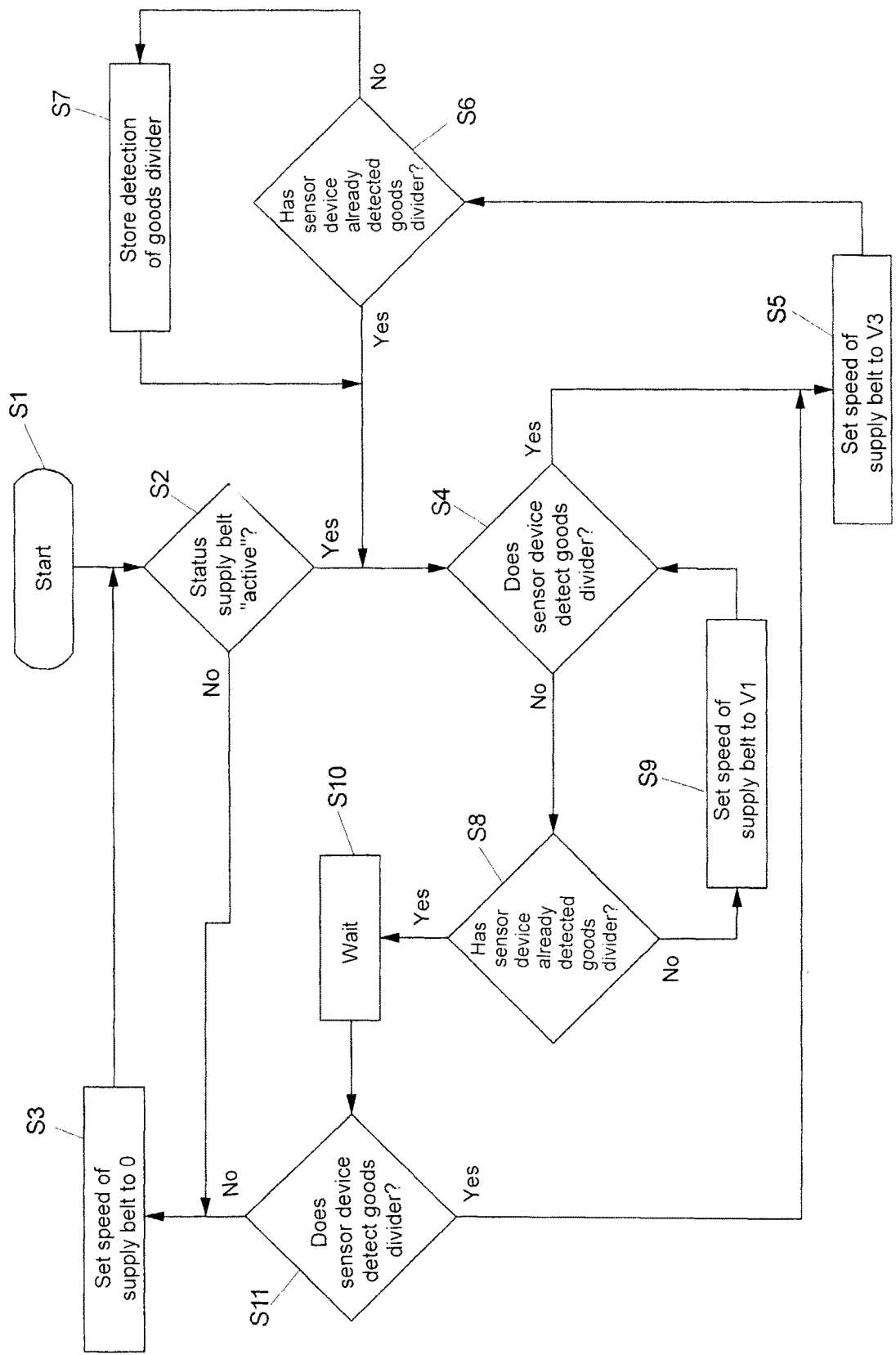

CHECKOUT SYSTEM ASSEMBLY WITH GOODS SEPARATOR DETECTION

CROSS-REFERENCE TO A RELATED APPLICATION

This application claims priority to European Patent Application No. 15 165 711.1 filed on Apr. 29, 2015, the entirety of which is incorporated by reference herein.

BACKGROUND

This invention relates to a POS (point of sale) system arrangement and to a method for operating a POS system arrangement.

Such POS system arrangement includes a transport belt and a goods detection device. The transport belt device comprises at least one belt portion which for the transport of the goods present thereon can be put into a feed movement along a goods feed path, wherein the goods are separable from each other along the goods feed path by at least one goods divider. The goods detection device is formed and provided to detect goods which are transported by the transport belt device.

A POS system arrangement as mentioned above is known from DE 10 2008 010 642 A1. A goods divider with an oblong body and a machine-readable mark is used for separating goods deposited on a goods transport belt. A scanning device serving as goods detection device for the optical recognition of a machine-readable mark on the goods thus can add the prices of goods present on the goods transport belt between a first and a second goods divider. The machine-readable marks both on the goods and on the goods dividers are detected by the scanning device. The machine-readable mark can be formed as optical bar code or as RFID chip.

In the known POS system arrangement it is disadvantageous that goods deposited on the transport belt closely one beside the other possibly cannot clearly be recognized by the scanning device, for example because a first piece of goods conceals an optical sight axis between the scanning device and a machine-readable mark formed as optical code on a second piece of goods. A possible consequence is an unreliable goods recognition of the known POS system arrangement. Customers of the POS system arrangement also frequently are not used or trained to place goods on the transport belt at sufficient distances to each other, so that a reliable recognition of all goods by the scanning device is ensured. To ensure the highest possible comfort for the customers, it therefore is desirable to ensure a reliable goods recognition, even if a customer deposits his/her goods on the transport belt at dense distances to each other.

SUMMARY

It is an object of the present invention to improve the known POS system arrangement, in particular the reliability of the goods recognition.

This object is solved by a subject-matter with the features as described herein.

At least one sensor device and control device are provided, wherein the at least one sensor device is arranged at a distance from the goods detection device along the goods feed path and comprises a sensor and a detection area. The sensor device is formed and provided to detect whether or not a goods divider is present in the detection area. The control device is formed and provided to control the feed movement of the belt portion of the transport belt device in dependence on the detection of the goods divider in the detection area of the sensor device.

Due to the spaced arrangement of the sensor device (in particular of the detection area) from the goods detection device it is possible to monitor the goods feed by detection of the goods divider at a point spaced from the goods detection device (along the goods feed path). The information as to whether or not the goods divider is present in the detection area of the sensor device can be used to improve the efficiency and/or the reliability of the goods recognition of the POS system arrangement.

The POS system arrangement generally can be used as checkout place in the wholesale or retail trade, for example in goods trading markets such as DIY stores, supermarkets etc.

For example the goods detection device of the POS system arrangement can be formed as portal scanner, e.g. as 360° portal scanner with optical detection of the type and number of the goods. A portal scanner provides a portal through which goods can be transported. During the transport through the portal, type and number of the goods are recognized automatically. Thus, a particularly efficient checkout procedure is possible. Alternatively, the POS system arrangement can however also be used with a detection device (manually) operated by personnel.

For example, the sensor device is arranged upstream of the goods detection device (along the goods feed path). As intended, the goods divider is deposited by a customer on the transport belt device such that it is located between the goods of the customer and the goods of a preceding or succeeding other customer along the goods feed path. The goods divider can indicate the end of the goods of the one customer and the beginning of the goods of the next customer at the same time. When the sensor device is arranged upstream of the goods detection device (at a known distance), the control device can determine how long the at least one belt portion of the transport belt device must perform a feed movement with a particular speed, so that all goods of the one customer have covered the distance between the detection area of the sensor device and the goods detection device.

Alternatively or in addition, the sensor device can however also be arranged downstream of the goods detection device (along the goods feed path). Thus, it might be determined for example whether the goods divider is transported by means of the transport belt device as expected or whether there is e.g. a backlog of goods.

The sensor device can be configured to detect whether the goods divider is present in the detection area by reading out a machine-readable code provided at the goods divider by means of the sensor. It thereby is possible to particularly clearly detect a goods divider.

The machine-readable code in particular can be read out by means of electromagnetic fields. An electromagnetic field can be generated by the sensor of the sensor device.

The machine-readable code provided on the goods divider can be provided in various ways. Preferably, the machine-readable code is provided by an RFID tag. The sensor of the sensor device preferably is formed as RFID antenna for reading out the RFID tag of the goods divider. The sensor device can recognize a goods divider without an optical visual connection having to exist between the sensor and the goods divider. The RFID antenna and the RFID tag in particular can be formed for RFID communication in a frequency band with 13.56 MHz. To ensure the best possible detection of the RFID tag, the goods divider should be made of a non-metallic material, in order to avoid attenuations or shadowing effects of the antenna field. In this case, the RFID tag can be located in the interior of the divider bar (ideally centrally in the inner core), in order to ensure that the tag can equally be detected in every position and rotation of the bar. Alternatively, however, RFID tags equipped with a plastic insulation (e.g. in the form of a thin plastic film) also can be applied onto a possibly metallic surface of the divider bar (from outside). The goods divider can be formed oblong. The RFID tag can be arranged centrally along the longitudinal extension of the goods divider. Alternatively, the RFID tag can extend e.g. substantially along the entire longitudinal extension of the goods divider. For example, an RFID tag available under the designation TW-R16-B128 can be used. For an optimized detection a convex RFID tag furthermore can be provided.

Alternatively or in addition, the machine-readable code can however also be formed for example as bar code or as so-called QR code. The sensor device then preferably comprises one or more sensors formed as optical detection means for reading out the bar or QR code, wherein in this case reading of a bar or QR code is meant by reading out.

The POS system arrangement can comprise a plurality, in particular a multitude of goods dividers on each of which a machine-readable code is provided. Preferably, several—in particular all—machine-readable codes differ from each other. Thus, the plurality of goods dividers can be distinguished from each other and be identified unambiguously by the sensor device. The sensor device can be configured to detect (and possibly also clearly identify) several goods dividers present in the detection area at the same time. The machine-readable codes for example can comprise a UID (Unique Identifier). By reading out the UID, the control device can distinguish goods dividers from pieces of goods which likewise can comprise RFID tags. For this purpose, the control device can suitably store a list of UIDs (possibly expandable subsequently) or be connected with an external storage device. By comparing the UID read out with the stored UIDs, the control device can detect whether the UID is associated to a (or a particular) goods divider. In dependence thereon, it can control the feed movement of the belt portion of the transport belt device.

The goods detection device can comprise a sensor and a detection area associated to the sensor. The sensor of the goods detection device is configured to detect the machine-readable code provided on the goods divider, when the goods divider is present in the detection area of the goods detection device. The detection area of the goods detection device is formed on the goods detection device or adjacent thereto. In particular, the detection area of the goods detection device is arranged at a distance from the detection area of the sensor device. The goods detection device (or the control device possibly connected therewith) can recognize whether or not a (or a particular) goods divider is present in the detection area of the goods detection device.

The control device can be configured to put at least one belt portion of the transport belt device into a feed movement out of a standstill (or alternatively change the speed of the feed movement from a first speed into a second speed different therefrom), when it receives a control signal when it recognizes that a predetermined or predeterminable service life has expired and/or when a user enters a corresponding command to the control device. For example, an actuating means such as a key can be provided, which can be actuated by a user (e.g. a customer), wherein upon actuation of the actuating means the control device puts the belt portion of the transport belt device into a feed movement. A control signal can be provided e.g. by a packing trough sensor of the POS system arrangement, which recognizes whether a packing trough (of a goods removal area of the POS system arrangement) is loaded with goods or is free. For example, the packing trough sensor provides a control signal when the packing trough (or in case several packing troughs are provided, a or a particular packing trough) is free.

Alternatively or in addition, the control device is configured to put at least one belt portion of the transport belt device into a feed movement out of a standstill, when the sensor of the goods detection device detects a goods divider in the detection area of the goods detection device.

For example, the control device can be configured to control the feed movement of at least one such belt portion of the transport belt device in dependence on the detection of the goods divider in the detection area of the sensor device (or alternatively or in addition in the detection area of the goods detection device), which belt portion is arranged upstream of the goods detection device along the goods feed path. In this way, the control device can control the transport belt device such that the speed of the supply of goods to the goods detection device is increased or reduced, or that the supply of goods to the goods detection device is started or stopped, depending on whether or not a goods divider (or a particular goods divider) is detected at the upstream sensor device.

The transport belt device can comprise at least one first belt portion and one second belt portion. The first belt portion can be formed for depositing goods and provide a goods deposition area. The second belt portion can be formed for supplying the goods deposited on the first belt portion into the detection area of the goods detection device. Of course, there can also be provided further belt portions. In particular, the first belt portion can be arranged upstream of the second belt portion along the goods feed path. When the first belt portion arranged in this way is put into a feed movement, it will supply goods deposited thereon to the second belt portion.

The first and the second belt portion can be operated with different feed rates. The control device can be configured to put the first belt portion into a feed movement with a first speed and the second belt portion into a feed movement with a second speed. It can be provided in particular that the second speed is greater than the first speed. Due to the higher speed of the second belt portion, the distances of several goods to each other can be increased along the goods feed path (a goods separation can be achieved). Due to greater distances between individual goods, a higher precision and reliability is possible during the detection of the goods at the goods detection device. The control of the speeds also can be effected under certain conditions, e.g. in dependence on the detection of the goods divider in the detection area of the sensor device.

The control device can be configured to reduce a speed of the feed movement of the first belt portion, while the goods divider is present in the detection area of the sensor device and is detected by the sensor of the sensor device. Due to the reduced speed, a reliable allocation of goods on both sides of the goods divider to the respective customers can be achieved. Both the first and the second belt portion each can be divided into several sections which can independently be put into a feed movement.

Furthermore, the control device can be configured to stop the first belt portion as soon as the goods divider has left the detection area of the sensor device. In this way it can be ensured that goods which possibly follow the goods divider are not transported further. For example, these are goods of the next customer.

The first belt portion can adjoin the second belt portion at a transition. The detection area of the sensor device then preferably (but not necessarily) is arranged at the transition between the first and the second belt portion. By corresponding control of the belt portions, it thus becomes possible to separate goods on both sides (along the goods feed path) of the goods divider, when a goods divider is detected at the detection area of the sensor device.

The detection area of the sensor device substantially can extend across the entire width (transversely to the goods feed path at this point of the transport belt device) of the first belt portion (e.g. about 45 cm). Thus, a high reliability and precision can be achieved in the detection of the goods divider.

In an exemplary embodiment the goods feed path can be formed branched. The first belt portion for example can comprise several supply belts which are connected with the second (the same) belt portion such that goods can be transported from the supply belts to the second belt portion and be passed on from the same. Thus, several customers can deposit goods on the POS system arrangement at the same time and the goods can be detected by the same goods detection device. Frequently, the detection of goods is effected with a higher speed than the deposition of goods by customers, so that by using several first belt portions the utilization of the goods detection device can be increased.

It should be noted that the POS system arrangement also can comprise several sensor devices. The same in particular can be arranged at a distance from each other along the goods feed path.

The object also is solved by a method for operating a POS system arrangement which includes a transport belt device and a goods detection device. The transport belt device comprises at least one belt portion which for the transport of goods present on the same can be put into a feed movement along a goods feed path, wherein the goods are separable from each other along the goods feed path by at least one goods divider. The goods detection device can detect goods transported by means of the transport belt device. It is provided that the POS system arrangement furthermore comprises at least one sensor device arranged at a distance from the goods detection device along the goods feed path and a control device, wherein the sensor device includes a sensor and a detection area and detects by means of the sensor whether or not the goods divider is present in the detection area, and wherein the control device controls the feed movement of the belt portion of the transport belt device in dependence on the detection of the goods divider in the detection area of the sensor device.

The advantages and advantageous aspects described above for the POS system arrangement analogously are also applicable to the method, so that reference will be made to the above explanations.

BRIEF DESCRIPTION OF THE DRAWINGS

The invention will be explained in detail below by means of several exemplary embodiments with reference to the Figures.

FIG. 4 shows a schematic representation of a POS system arrangement according to another exemplary embodiment.

FIG. 6 shows a flow diagram of a control of a POS system arrangement.

DETAILED DESCRIPTION

Figure 1A:
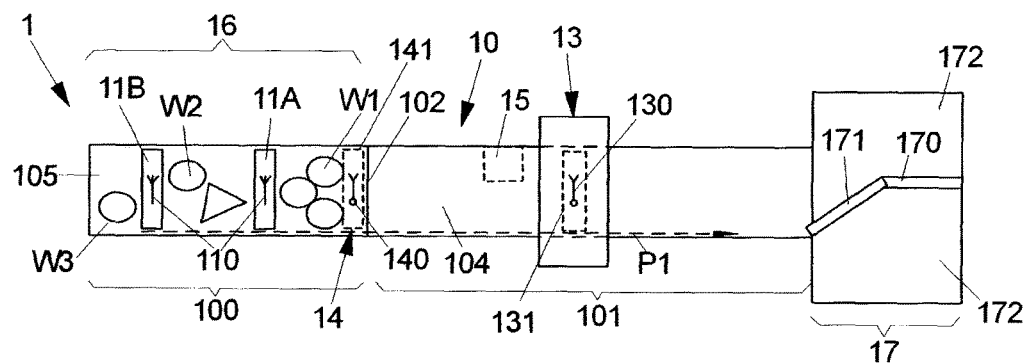
FIGS. 1A-1F show a schematic representation of a POS system arrangement according to an exemplary embodiment in several stages of a transport of goods of several customers.
Figure 1B:
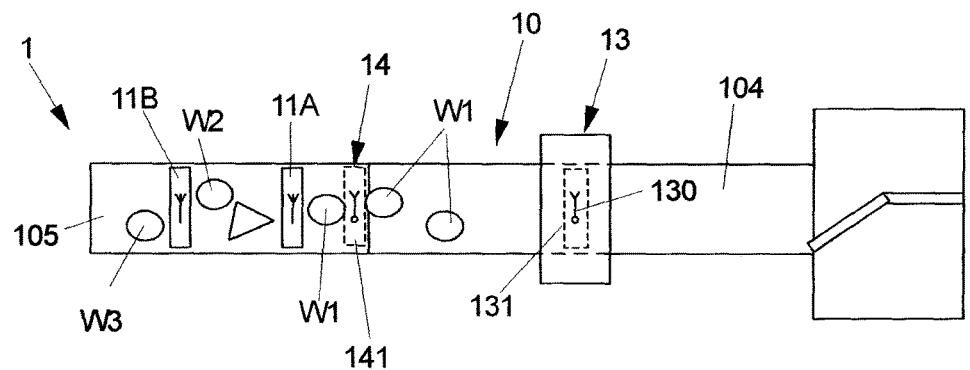
Figure 1C:
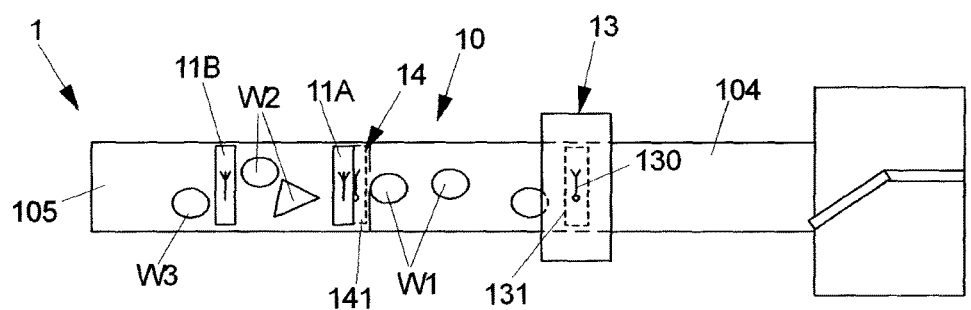
Figure 1D:
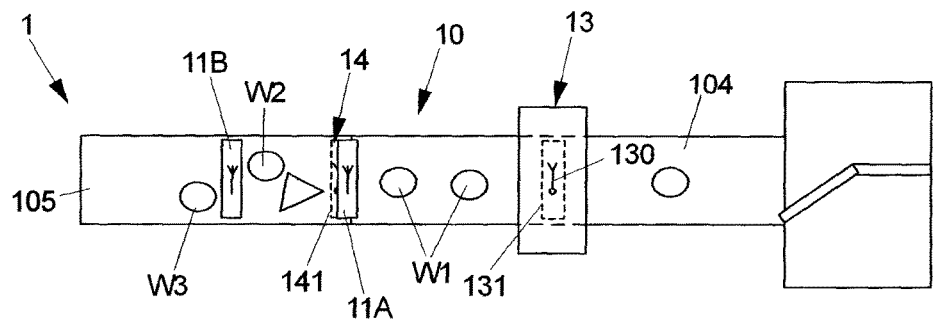
Figure 1E:
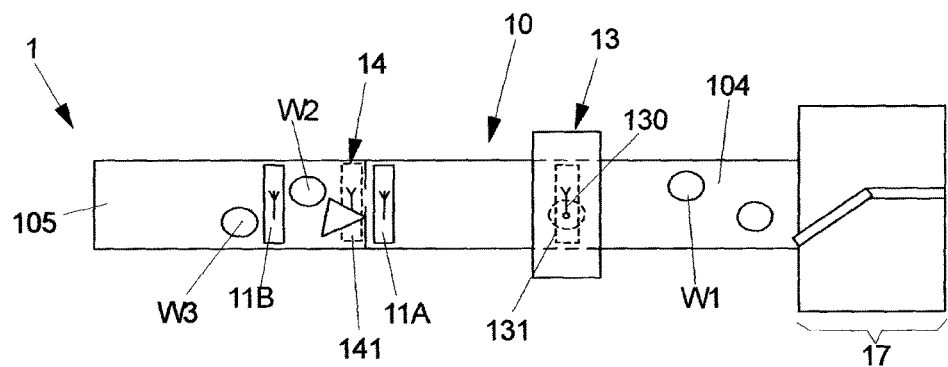
Figure 1F:
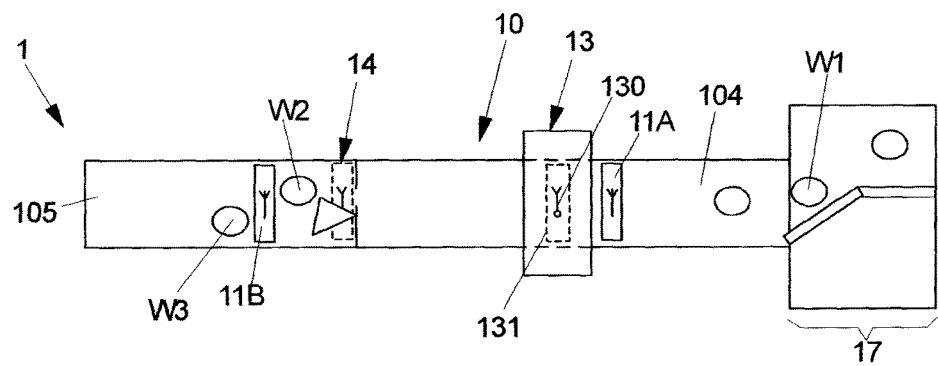
Figure 2:
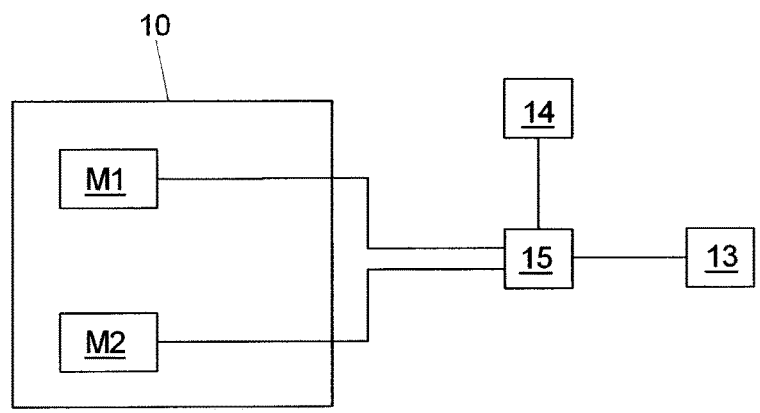
FIG. 2 shows a block circuit diagram with components of the POS system arrangement of FIGS. 1A-1F.

FIGS. 1A to 10F show an exemplary embodiment of a POS system arrangement 1. FIG. 2 shows the connection of some components of the POS system arrangement among each other. The POS system arrangement 1 comprises a goods deposition area 16, a goods removal area 17 and a transport belt device 10. Goods W1-W3, which were deposited in the goods deposition area 16, can be transported by means of the transport belt device 10 along a goods feed path P1 into the goods removal area 17. The goods removal area 17 here comprises two packing troughs 172, from which goods W1-W3 present therein can be removed and which are separated from each other by a packing trough separation. The packing trough separation comprises an immovable barrier element 170 and a movable barrier element 171 attached thereto. The one barrier element can pivotally be articulated to the other barrier element. The packing trough separation also can be realized only by a movable barrier element.

The transport belt device 10 comprises a first belt portion 100 and a second belt portion 101. The second belt portion 101 adjoins the first belt portion 100. Both belt portions 100, 101 can be put into a feed movement and thus can transport goods W1-W3 from the goods deposition area 16 into the goods removal area 17. The belt portions 100, 101 form a transition 102 between themselves. When goods W1-W3 are transported from the first belt portion 100 to the second belt portion 101, the cross the transition 102 between the belt portions.

Here, the goods deposition area 16 is provided by the first belt portion 100. The first belt portion 100 is formed by a closed, circulating supply belt 105. This supply belt 105 is driven via a motor M1 (cf. FIG. 2). The goods removal area 17 adjoins the second belt portion 101. The second belt portion 101 is arranged between the first belt portion 100 and the goods removal area 17.

The POS system arrangement 1 furthermore comprises a goods detection device in the form of a portal scanner 13. The portal scanner 13 is arranged on the second belt portion 101 of the transport belt device 10. The portal scanner 13 is arranged approximately centrally on the second belt portion 101 (or halfway between the first belt portion 100 of the transport device 10 and the goods removal area 17). The second belt portion 101 is formed by a closed, circulating removal belt 104 by means of which goods W1-W3 can be transported away from the transition 102 and be supplied to the portal scanner 13. The removal belt 104 is driven by a motor M2.

Furthermore, the portal scanner 13 is arranged at a distance to the transition 102 between the two belt portions 100, 101.

The portal scanner 13 comprises one or more means for the detection of goods which are transported through the portal scanner 13. For example, the portal scanner 13 can comprise several optical scanning means, in order to recognize bar codes or similar marks on the goods W1-W3 and thus determine the type and number of the goods W1-W3. With reference to the type and number of the goods W1-W3 of a customer, the individual prices of the goods W1-W3 and a sum to be paid by the customer can be determined.

For controlling the transport belt device 10, the portal scanner 13 and a sensor device 14 yet to be explained in detail, the POS system arrangement 1 comprises a control device 15. The same is, as shown in FIG. 2, connected with the motors M1, M2 of the transport belt device 10, with the portal scanner 13 and with the sensor device 14. The connection is made e.g. via control lines. As an alternative to the illustrated connection of the motors M1, M2 of the transport belt device 10 with the control device 15, the motors also might be controlled by a control unit not shown in the Figures (e.g. a memory-programmable controller which possibly also controls further non-illustrated functions of the POS system arrangement), which in turn is connected with the control device 15 and receives signals from the same.

Alternatively, the belt portion 100 or belt portion 101 can be realized by a means other than a closed, circulating removal belt, such as by a roller track or a roller conveyor or roller carpet.

The control device 15 is shown merely schematically in FIG. 1A and is suitably connected with the transport belt device 10, the portal scanner 13 and the sensor device 14, e.g. by electric control cables, via an RS-232 interface, an RS-485 interface and/or a CAN bus. Alternatively, the control device 15 can however also be integrated e.g. into the portal scanner 13 or into the sensor device 14, which then also serves as control device. In yet another alternative the control device 15 is arranged at a distance from the remaining POS system arrangement 1. In this case, too, the control device 15 is connected with the POS system arrangement 1 (or its individual components controlled by the control device 15) via suitable means, e.g. via electric control cables, via an RS-232 interface, an RS-485 interface and/or a CAN bus.

Several customers can deposit their goods W1-W3 in the goods deposition area 16 one after the other (as seen along the goods feed path P1). The goods W1-W3 of the different customers are separated from each other by means of goods dividers 11A, 11B. The goods dividers 11A, 11B provide for an allocation of certain goods to the different customers. In the present case, goods W1 of a first customer, goods W2 of a second customer and goods W3 of a third customer are shown schematically. The goods W1-W3 are separated from each other by two goods dividers 11A, 11B.

The goods dividers 11A, 11B substantially are oblong, in particular bar-shaped. The goods dividers 11A, 11B approximately are so long that they span a large part of the width of the first or second belt portion 100, 101 transversely to the goods feed path P1, when they are arranged substantially transversely to the goods feed path P1. In cross-section, the goods dividers 11A, 11B are formed e.g. substantially square, rectangular or triangular.

The goods dividers 11A, 11B each comprise a machine-readable code. The machine-readable code each can be read out by means of an electromagnetic field which is provided e.g. by a sensor. In the present exemplary embodiment the machine-readable codes are provided by one RFID tag 110 each. The RFID tag can be formed by a 13.56 MHz transponder known per se.

At the end of the first belt portion 100 of the transport belt device 10 the sensor device 14 mentioned already is arranged. In the present case, the sensor device 14 is provided at the first belt portion 100 adjacent to the transition 102 between the first and the second belt portion 100, 101 of the transport belt device 10. The sensor device 14 comprises a detection area 141 (in FIGS. 1A to 1F shown in broken lines). Furthermore, the sensor device 14 comprises a sensor in the form of an RFID antenna 140. The RFID antenna 140 is configured to recognize RFID tags 110 of a goods divider 11A, 11B (or of several goods dividers 11A, 11B) and read out its machine-readable code, when the goods divider 11A, 11B is present in the detection area 141 of the sensor device 14. The RFID antenna 140 of the sensor device 14 here is arranged below the transport belt of the first belt portion 100, i.e. the transport belt of the first belt portion 100 is located between the goods W1-W3 deposited thereon and the RFID antenna 140 of the sensor device 14 arranged thereunder.

The machine-readable code of the RFID tags 110 comprises a UID by means of which each goods divider 11A, 11B is clearly identifiable. Possibly, individual pieces of goods also can comprise an RFID tag. The control device 15 comprises a list of UIDs of the goods dividers 11A, 11B and thus can distinguish goods dividers 11A, 11B from pieces of goods with RFID tags.

In the exemplary embodiment according to FIGS. 1A-1F the portal scanner 13 also comprises a sensor in the form of an RFID antenna 130 as well as an associated detection area 131. The formation and function of the RFID antenna 130 correspond to the formation and function of the RFID antenna 140 of the sensor device 14, so that reference is made to the corresponding description. In contrast to the RFID antenna 140 of the sensor device 14, the RFID antenna 130 of the portal scanner 13 however is arranged in the region of the portal scanner 13 at the second belt portion 101 of the transport belt device 10.

The sequence of several succeeding checkout procedures will now be explained in detail with reference to the individual FIGS. 1A-1F, which all show the same POS system arrangement 1 in various stages of the transport of goods W1-W3 of several customers.

According to FIG. 1A three customers have deposited their goods W1-W3 one after the other in the goods deposition area 16 on the first belt portion 100 of the transport belt device 10. Between the goods W1, W2 of the first and the second customer, a goods divider 11A was deposited by one of the customers. The goods divider 11A is oriented substantially vertically to the goods feed path P1. Similarly, a further goods divider 11B has been deposited between the goods W2, W3 of the second and the third customer. The goods W1-W3 of the individual customers thus are each separated from each other by the goods dividers 11A, 11B.

The control device 15 actuates the first belt portion 100 of the transport belt device 10 such that the same performs a feed movement with a first speed V1. Furthermore, the control device 15 actuates the second belt portion 101 of the transport belt device 10 such that the same performs a feed movement with a second speed V2. The feed movements are effected along the goods feed path P1 in direction from the goods deposition area 16 towards the goods removal area 17. The first speed V1 is lower than the second speed V2. The first speed V1 e.g. can amount to approximately two thirds, half of or one third of the second speed V2. For example, the first speed V1 lies in a range of 10 cm/s to 20 cm/s. The second speed V2 for example can amount to 32 cm/s.

For controlling the motor of the supply belt 105 and possibly also the motor of the removal belt 104 the POS system arrangement 1 can comprise a frequency converter. It can be provided that the control unit 15 is configured to charge the frequency converter with analog signals. Concretely, the control unit 15 can be connected with the frequency converter by the following electric lines: by a first control line, a second control line and a ground line. At the first control line the control unit 15 can provide an electric voltage of 0 V or of 24 V, in order to switch a motor off or on. At the second control line the control unit 15 can provide various voltages, in order to adjust a rotational speed of the motor. In particular, a voltage of 5 V can be provided for a low rotational speed, when a goods divider 11A, 11B is detected by the sensor device 14. Correspondingly, a voltage of 10 V can be provided for a higher rotational speed. The speed of a feed movement of a transport belt results from the rotational speed of the motor.

Alternatively it can be provided, for example, that the control device 15 provides signals to a memory-programmable controller which actuates the frequency converter in dependence on these signals.

Due to the higher speed of the feed movement of the second belt portion 101 as compared to the first belt portion 100 it follows that the goods W1-W3 on the second belt portion 101 have a larger distance to each other than on the first belt portion 100.

In FIG. 1B, as compared to FIG. 1A, the goods W1-W3 have already been transported a certain distance along the goods feed path P1 in direction of the goods removal area 17. Some of the goods W1 of the first customer already have crossed the transition 102 between the first and the second belt portion 100, 101 and are conveyed by the second belt portion 101. Both goods dividers 11A, 11B still are located outside the detection area 141 of the sensor device 14.

In FIG. 1C the goods W1-W3 have been transported a certain further distance as compared to FIG. 1B. All of the goods W1 of the first customer already have crossed the transition 102 between the first and the second belt portion 100, 101 and are conveyed by the second belt portion 101. The goods divider 11A arranged between the goods W1, W2 of the first and the second customer already has partly been transported into the detection area 141 of the sensor device 14 and now is detected by the RFID antenna 140 of the sensor device 14. The information collected by the RFID antenna 140 is provided to the control device 15. When the control device 15 recognizes the UID of a goods divider 11A, 11B, it reduces the speed of the feed movement of the first belt portion 100 to a speed V3 which is lower than the speed V1. In one embodiment the speed might be reduced e.g. from 20 cm/s to a value for V3 between 10 cm/s and 12 cm/s, in particular 10 cm/s. In addition, it can possibly be provided that the control device 15 also reduces the speed of the feed movement of the first belt portion 100 when many goods dividers 11 are detected at short intervals. The evaluation of all tags otherwise might lead to too large a delay.

In FIG. 1D the goods W1-W3 have been transported further a certain distance as compared to FIG. 1C. The goods divider 11A is located between the goods W1, W2 of the first and the second customer still partly in the detection area 141 of the sensor device 14. The control device 15 therefore still keeps the speed of the feed movement of the first belt portion 100 on the speed V3 which is lower than the speed V1. The speed of the feed movement of the second belt portion 101 still is at V2. In FIG. 1D a part of the goods W1 of the first customer already has moved through the portal scanner 13. Type and number of these goods were detected by the portal scanner 13 when moving through the same.

By a further feed of the first and the second belt portion 100, 101, the goods divider 11A between the goods W1, W2 of the first and the second customer leaves the detection area 141 of the sensor device 14, as shown in FIG. 1E. The RFID antenna 140 of the sensor device 14 hence no longer detects the goods divider 11A. In response thereto, the control device 15 stops the first belt portion 100. Preferably, the control device 15 brings the first belt portion 100 to a standstill within 500 ms after the goods divider 11A has left the detection area 141.

Goods W2 of the second customer following the goods divider 11A remain on the first belt portion 100 now standing still. The goods divider 11A has left the detection area 141 of the sensor device 14 arranged on the first belt portion 100 and adjacent to the transition 102 and hence already is on the second belt portion 101. The goods W1 of the first customer and the goods divider 11A following these goods W1 are transported to the goods removal area 17 by the second belt portion 101 still operated with the speed V2. In doing so, they pass the portal scanner 13.

In FIG. 1F all goods W1 of the first customer and the following goods divider 11A have passed the portal scanner 13 and are guided into the packing trough 172 shown above by the movable barrier element 171 closing the packing trough 172 shown at the bottom of FIGS. 1A-1F.

In FIG. 1F the goods divider 11A following the goods W1 of the first customer already has passed the detection area 131 of the portal scanner 13. In doing so, it has been detected by the RFID antenna 130 of the portal scanner 13. The information collected by the RFID antenna 130 of the portal scanner 13 is provided to the control device 15. Thereupon, the control device 15 has again put the first belt portion 100 into a feed movement with the speed V1. Thereupon, the transport of the goods W2 of the second customer through the portal scanner 13 starts analogous to the above-described transport of the goods W1 of the first customer. Before the goods W2 of the second customer reach the goods removal area 17, the control device 15 actuates the movable barrier element 171 such that it swivels and clears the other one of the two packing troughs 172.

In this way, the first customer has enough time to remove his/her goods W1 from the goods removal area 17.

FIGS. 3A-3I show another exemplary embodiment of a POS system arrangement 1' with a transport belt device 10'. In some parts, this corresponds to the exemplary embodiment of the POS system arrangement 1 according to FIGS. 1A-1F, wherein identical reference numerals indicate corresponding components, for whose description reference is made to the description of the exemplary embodiment of the POS system arrangement 1 according to FIGS. 1A-1F.

The POS system arrangement 1' according to FIGS. 3A-3I comprises a first belt portion 100' with a first and a second supply belt 105A, 105B and hence two goods deposition areas 16. The two supply belts 105A, 105B of the first belt portion 100' are arranged substantially parallel to each other and to the removal belt 104 of the second belt portion 101'.

For connecting the two supply belts 105A, 105B of the first belt portion 100', the transport belt device 10' of the POS system arrangement 1' comprises a connecting portion 103 associated to a second belt portion 101'.

The transport belt device 10' forms a branched goods feed path P2 which connects the two parallel supply belts 105A, 105B of the first belt portion 100' with the second belt portion 101'.

Between each of the two supply belts 105A, 105B of the first belt portion 100' and the connecting portion 103 a transition 102 is formed. Goods W1-W4 which cross one of the transitions 102 can be transported to the removal belt 104 by the connecting portion 103. The connecting portion 103 is formed e.g. by one or more transport belts and/or by at least one ramp. For guiding the goods W1-W4, slopes 106 are arranged at the connecting portion 103. The slopes 106 each extend between a lateral edge of a supply belt 105A, 105B up to a lateral edge of the removal belt 104. The slopes 106 serve to guide the goods W1-W4 at changes in direction of the goods feed path P2. The slopes 106 also serve to arrange goods W1-W4, which are positioned one beside the other (transversely to the direction of the goods feed) on the transport belt device 10', one behind the other along the goods feed path P2.

Adjacent to each of the transitions 102 a sensor device 14 is arranged on each of the supply belts 105A, 105B of the first belt portion 100'.

The sequence of the feed of the goods W1-W4 of four different customers is as described below. First of all, the control device 15 puts one of the two supply belts 105A, 105B of the first belt portion 100' into a feed movement (with the first speed V1). In the present example the first supply belt 105A as shown above first is put into a feed movement. Via the connecting portion 103 the goods W1 of the first customer thereby are transported to the removal belt 104 of the second belt portion 101', cf. FIGS. 3A-3D.

When the goods divider 11A between the goods W1, W3 of the first and third customer enters into the detection area 141 of the sensor device 14 associated to the first supply belt 105A of the first belt portion 100', and the associated RFID antenna 140 detects the goods divider 11A, the control device 15 slows down the feed rate of the first belt portion.

Figure 3A:
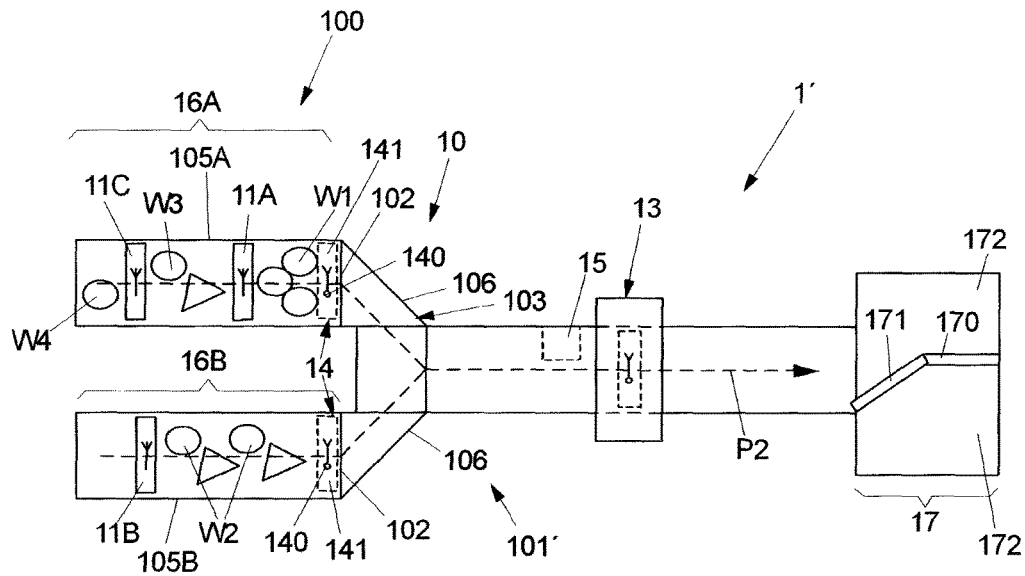
FIGS. 3A-3I show a schematic representation of a POS system arrangement according to another exemplary embodiment in several stages of a transport of goods of several customers.
Figure 3B:
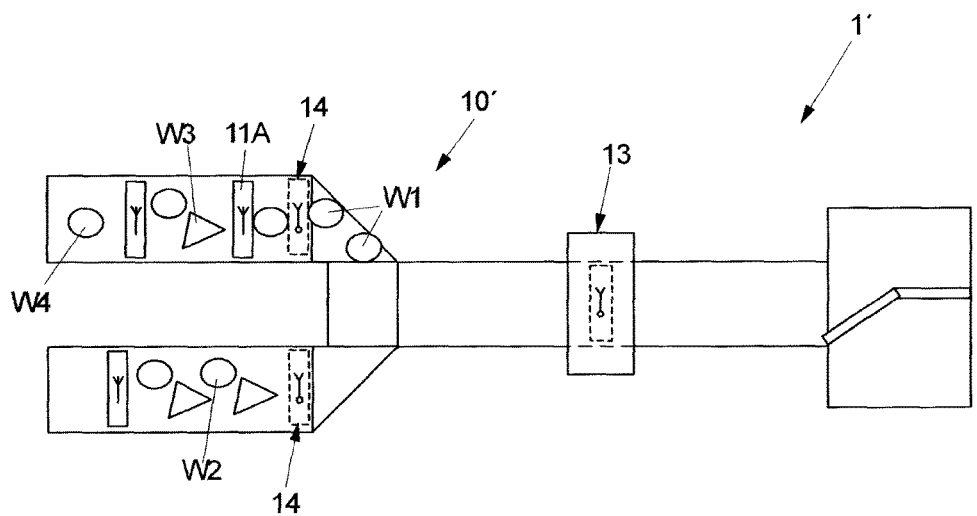
Figure 3C:
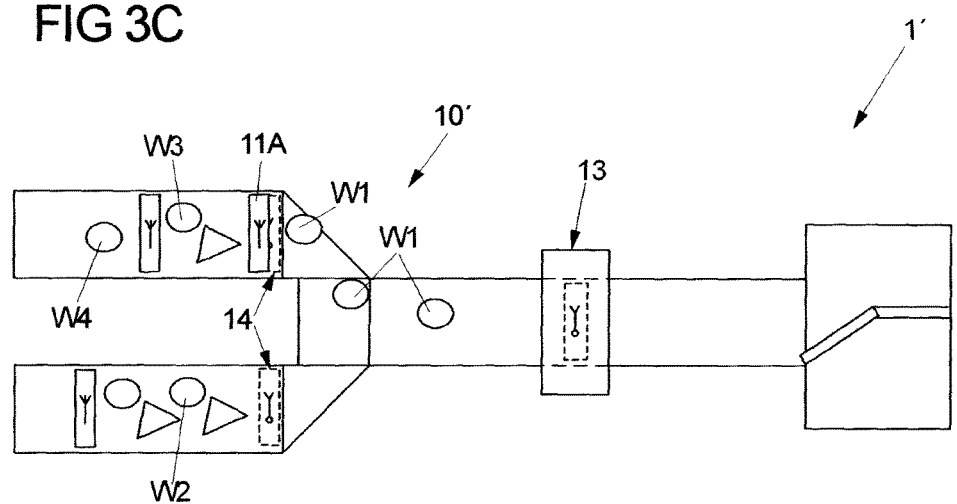
Figure 3D:
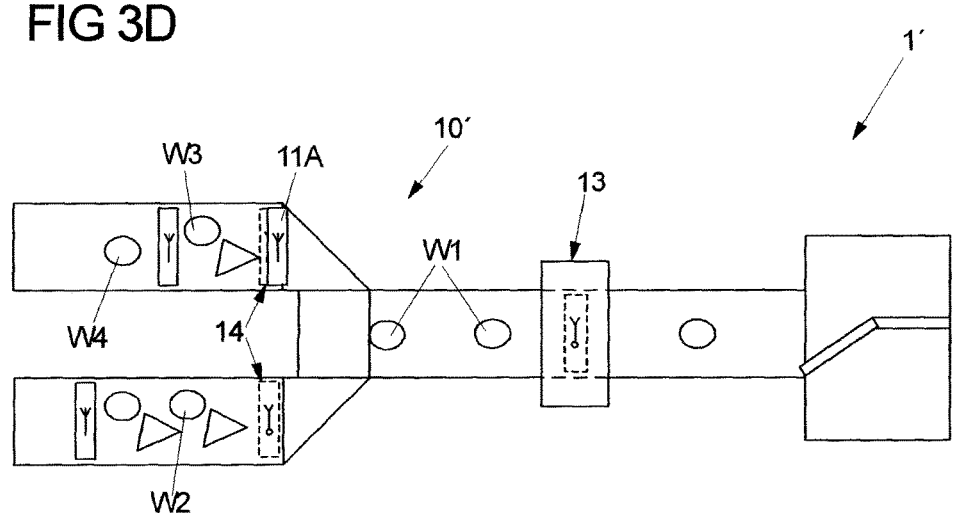
Figure 3E:
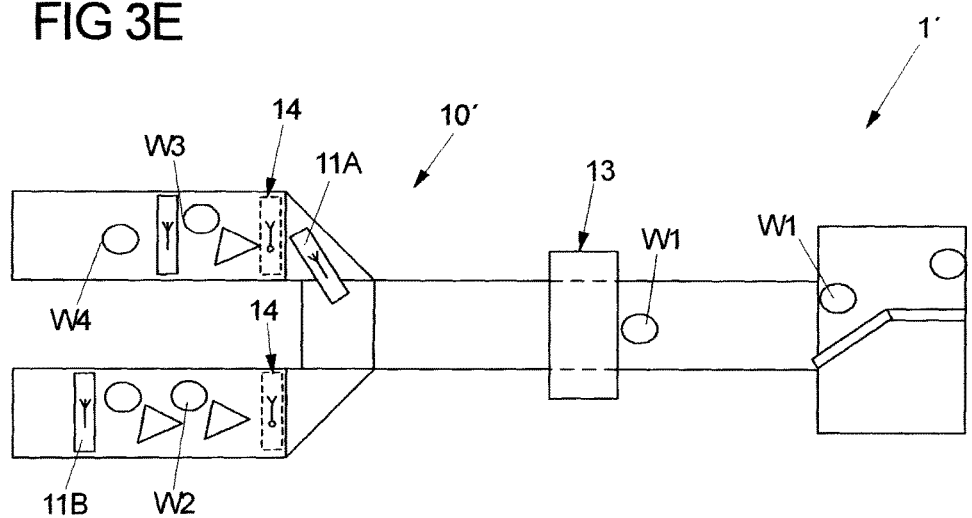

As soon as the goods divider 11A again leaves the detection area 141 of the sensor device 14, the control device 15 stops the first supply belt 105A of the first belt portion 100', cf. FIG. 3E.

Figure 3F:
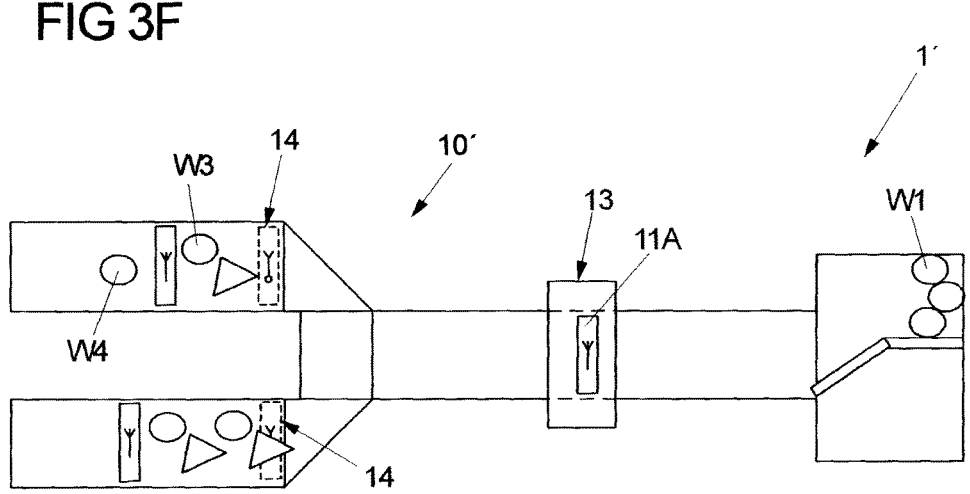
Figure 3G:
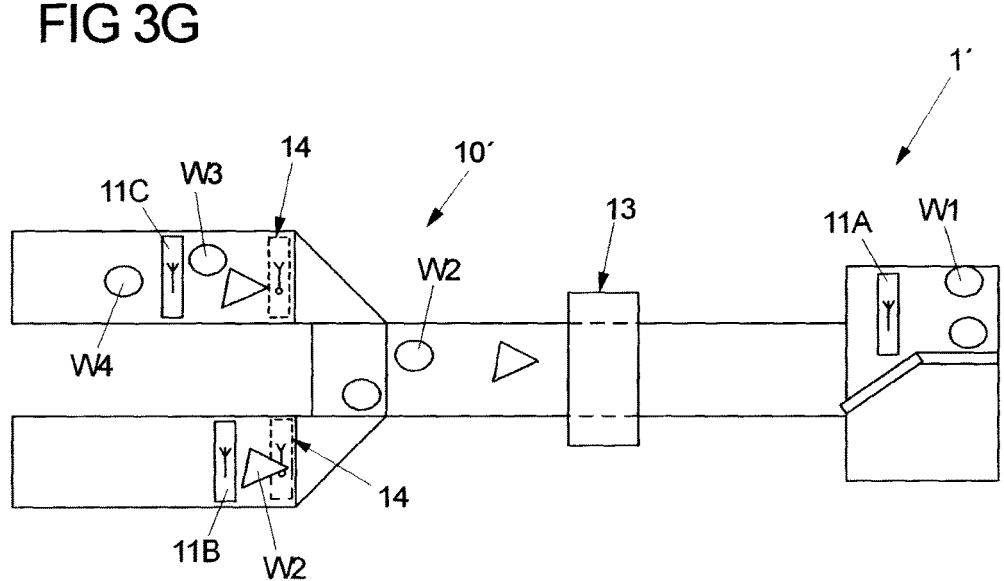

When the goods divider 11A following the goods W1 of the first customer is transported into the detection area 131 of the portal scanner 13 and is detected there by the RFID antenna 130 of the portal scanner 13, the control device 15 puts the second supply belt 105B of the first belt portion 100' into a feed movement (with the speed V1), cf. FIG. 3F.

Thereupon, the goods W2 of the second customer are transported through the portal scanner 13. To prevent the goods W1, W2 of the first and the second customer from mixing in the goods removal area 17, the control device 15 actuates the movable barrier element 171, so that the same swivels and closes the packing trough 172 into which the goods W1 of the first customer have been transported. This is effected before the goods W2 of the second customer arrive at the goods removal area 17, cf. FIG. 3G. The goods W2 of the second customer thereby are transported into the second packing trough 172 by the movable barrier element 171.

Figure 3H:
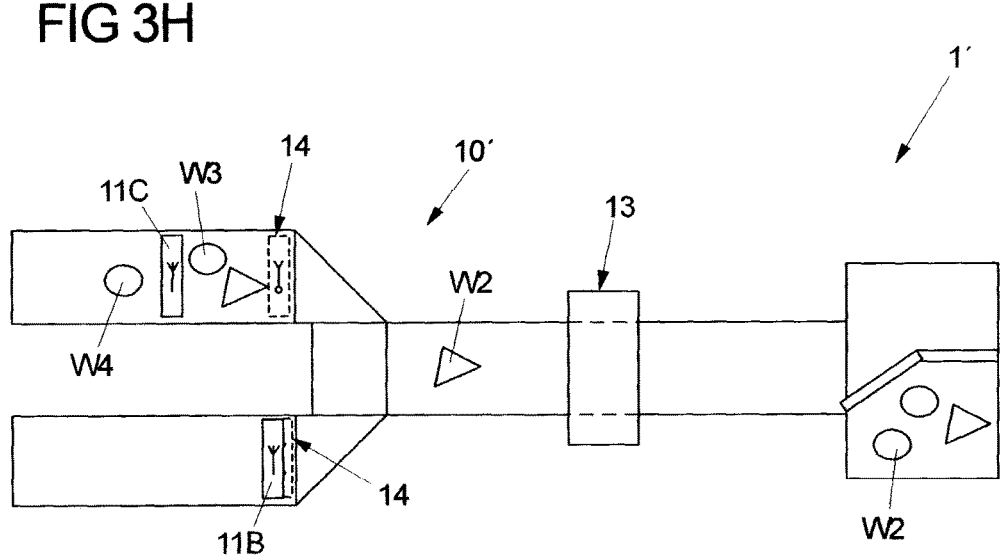

When the goods divider 11B following the goods W2 of the second customer is detected by the RFID antenna 140 in the detection area 141 of the sensor device 14 associated to the second supply belt 105B, the control device 15 reduces the speed of the second supply belt 105B, cf. FIG. 3H.

Figure 3I:
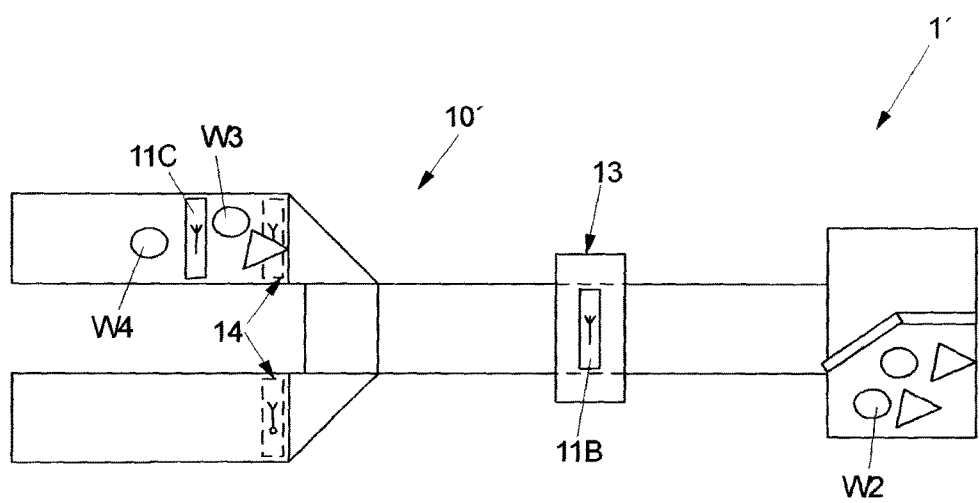

When the goods divider 11B leaves the detection area 141, the control device 15 stops the second supply belt 105B, cf. FIG. 3I.

Thereupon, the transport of the goods W3 of the third customer is effected analogous to the transport of the goods W1 of the first customer.

FIG. 4 shows another exemplary embodiment of a POS system arrangement 1". In some parts, this corresponds to the exemplary embodiments of the POS system arrangement 1; 1' according to FIGS. 1A-1F and FIGS. 3A-3I, wherein identical reference numerals indicate corresponding components, with respect to which reference is made to the above description.

The POS system arrangement 1" of FIG. 4 comprises a branched goods feed path P3 which here connects four supply belts 105A-105D of a first belt portion 100" with a second belt portion 101". The second belt portion for this purpose comprises a connecting portion 103' which with each of the supply belts 105A-105D of the first belt portion 100" each forms a transition 102.

At the connecting portion 103' several slopes 106 are provided. In the present case, a slope 106 each is arranged adjacent to each of the transitions 102. As shown in FIG. 4, one slope 106 each extends from a corner at which each of the transitions 102 meets with an edge (lateral along the feed direction) of the respective first supply belts 105A-105D of the first belt portion 100". The slopes 106 in addition each are arranged where the goods feed path P3 makes a change in direction. The connecting portion 103' is designed as transport belt.

The supply belts 105A-105D of the first belt portion 100" are oriented substantially parallel to the removal belt 104 and vertically to the connecting portion 103'. Moreover, the supply belts 105A-105D substantially correspond to the supply belts 105; 105A, 105B of the exemplary embodiments of the POS system arrangements 1; 1' according to FIGS. 1A-1F; 3A-3I. With respect to the formation and mode of operation of the portal scanner 13, the sensor devices 14 and the control device 15 reference also is made to the description provided there.

In the POS system arrangement 1" according to FIG. 4, a particularly large number of customers can deposit their goods W1-W4 at the same time. The goods W1-W4 are transported to the portal scanner 13 one after the other. The same can be utilized particularly efficiently. Several goods dividers 11A-11D separate goods W1-W4 of the customers on the supply belts 105A-105D from goods of preceding or succeeding customers.

The POS system arrangement 1" optionally can be followed by a non-illustrated goods removal area 17.

Figure 5:
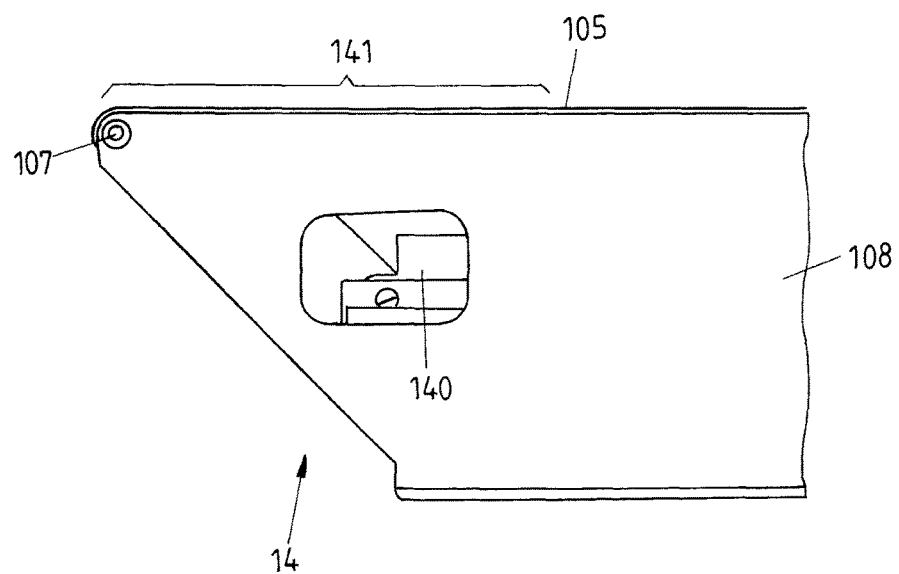
FIG. 5 shows a side view of a belt portion of a POS system arrangement and the arrangement of a sensor array.

FIG. 5 shows a side view of the end region of the supply belt 105 of the first belt portion 100; 100'; 100" which in the above-described exemplary embodiments of the POS system arrangements 1; 1'; 1" adjoins the respective second belt portion 101; 101'; 101" (and hence each forms a transition 102). At this point, the supply belt 105 is deflected at a deflection pulley 107. The deflection pulley 107 is articulated to a frame 108. The frame 108 is made of a metal, e.g. of aluminum or steel sheet.

In the view of FIG. 5 it can be seen that the RFID antenna 140 of the sensor device 14 is arranged below the supply belt 105. It also is arranged at a distance to the supply belt 105. The distance is between 1.5 cm and 10 cm. At such a distance a recognition of an RFID tag 110 of a goods divider 11A-11D is possible up to about 2.5 cm above the supply belt 105.

The RFID antenna 141 is height-adjustable (so that the distance to the supply belt 105 is adjustable). Thus, a detection of RFID tags as accurate as possible can be ensured.

The RFID antenna 140 substantially extends across the entire width of the supply belt 105. The RFID antenna 140 however can be slightly narrower than the supply belt 105

(e.g. about 2 cm). Preferably, a distance of about 1 cm on both sides exists between the RFID antenna 140 and the frame 108. Goods dividers 11A-11D thereby can be returned laterally at the supply belt 105 without being detected by the RFID antenna. Thus, a malfunction of the POS system arrangement 1; 1'; 1" will not occur when returning a goods divider (as is common practice at POS systems).

The detection area 141 of the sensor array 14 extends above the RFID antenna 140 (in proper use). For the protection of the RFID antenna 140 (e.g. against ingress of liquids) a non-illustrated plastic window (e.g. made of perspex, polycarbonate, composite HPL, or the like) is arranged between the RFID antenna and the supply belt 105.

The RFID antenna 141 is shielded against disturbances by other components of the POS system arrangement (e.g. a transport belt motor) by means of a suitable shield, e.g. by using shielded cable connections or cable connections provided with ferrite cores.

FIG. 6 shows a flow diagram according to which each supply belt of the above-described POS system arrangements 1, 1', 1" can be controlled by means of the control device 15.

First, the control device 15 is activated (step S1). If the controlled POS system arrangement comprises more than one supply belt, only one of the supply belts is active at the same time, in order to transport goods to the removal belt. In step S2 it is checked whether the status of the supply belt to be controlled currently is "active". If this is not the case, the speed of the supply belt is set to zero (or kept at zero) in step S3, whereupon the process again continues at step S2. The supply belt hence is stopped or left at standstill. On the other hand, when the status of the supply belt is "active", a transport operation starts (starting with step S4).

Setting the status of the supply belt to "active" is effected e.g. manually via the control device 15 (e.g. an SPS), for example by input of an operator. In particular, setting the status of the supply belt to "active" consists in setting a corresponding status indicator ("flag") of the control device 15. It also is conceivable that setting the flag to "active" is effected automatically upon occurrence of an event, e.g. in the case of a detected approach of a customer to the POS system arrangement (e.g. detection by means of a proximity sensor). The flag always only is set when a purchasing process is to be started.

In step S4 it is checked whether the sensor device 14 currently detects a goods divider 11A-11D.

When a goods divider 11A-11D currently is detected by the sensor device 14 in step S4, the process continues with step S5.

When no goods divider 11A-11D currently is detected by the sensor device 14 in step S4, the process continues with step S8. By inquiry of a memory provided for this purpose, it is checked whether the sensor device 14 already has detected a goods divider 11A-11D in the current transport operation. When it has not yet detected a goods divider 11A-11D in the current transport operation, the speed of the supply belt is set to V1 in step S9 and the process continues with step S4. The speed V1 is e.g. between 20 cm/s and 22 cm/s.

When it is recognized in step S8 by inquiry of the memory that in the current transport operation a goods divider 11A-11D already has been detected at least once by the sensor device 14, the control device 15 pauses in step S10, e.g. for 500 ms or for up to 500 ms. Thereafter, the process continues with step S11.

When a goods divider again is detected by the sensor device 14 in step S11, the process continues with step S5. In this way, short interruptions in the detection of the goods divider 11A-11D are taken into account.

When no goods divider 11A-11D is detected by the sensor device 14 in step S11, the control device 15 sets the speed of the supply belt to zero (or keeps it at zero) and proceeds to step S2.

In step S5 the supply belt is put into a speed V3. The speed V3 is e.g. between 10 cm/s and 12 cm/s. Thereupon, the process continues at step S6.

In step S6 it is checked by inquiry of the memory whether the sensor device 14 already has detected a goods divider 11A-11D in the current transport operation. When the goods divider 11A-11D has not yet been detected previously, the information that now a goods divider 11A-11D has been detected is stored in the memory in step S7. Thereupon, the process again continues with step S4.

The invention is not limited in its configuration to the exemplary embodiments described above, which merely are to be understood by way of example. Thus, a POS system arrangement for example also can include a non-illustrated number of transport belts of the first belt portions, e.g. three, five or six. In addition, it is not important that the transport belts of the first belt portions of the POS system arrangements are arranged parallel to each other.

In general, instead of a portal scanner another type of goods detection device can also be used. For example, the goods can comprise RFID tags and be detected by means of the RFID antenna of the goods detection device. Alternatively, a classical detection station operated by personnel also can be used as goods detection device.

Furthermore, it should be noted that the sensor (the RFID antenna) of the sensor device need not necessarily be arranged under the transport belt, but alternatively can also be arranged in general above the transport belt.

Furthermore, it should be noted that instead of an RFID tag other machine-readable codes can also be mounted on goods dividers, which then are read out by a corresponding other type of sensor. For example, the machine-readable code can be formed as bar code, as QR code or as other detectable (for example visible) marker (e.g. in the form of graphics, a clear pattern or image) or in the form of a digital watermark (in particular not perceptible by the human eye) (for example of the firm DigiMarc, Portland, USA). An optical detection unit then serves as sensor.

To protect the RFID antenna against electromagnetic interference fields which can influence the reliability of the detection of the RFID tags, the RFID antenna can be arranged within a unilaterally open ferrite cage or housing. The open side of the ferrite cage or housing points e.g. in direction of the detection area. When the RFID antenna is arranged below the supply belt, the open side can point upwards, for example. The ferrite housing in particular can be formed in the form of a cuboid of ferrite plates. The size of the opening of the ferrite cage or housing can be adjustable.

The size of the detection area can depend e.g. on the specific properties of the RFID antenna. Furthermore, the size of the detection area can be adjusted by adjusting e.g. the size of the opening of a ferrite cage or housing and/or by arranging a window or a boundary of metal, in particular metal plates, between the RFID antenna and the supply belt.

LIST OF REFERENCE NUMERALS

1, 1', 1''' POS system arrangement
10, 10', 10" transport belt device
100, 100', 100" first belt portion 101, 101', 101" second belt portion
102 transition
103, 103' connecting portion
104 removal belt
105, 105A-105D supply belt
106 slope
107 deflection pulley
108 frame
11A-11D goods divider
110 RFID tag
13 portal scanner (goods detection device)
130 RFID antenna (sensor)
131 detection area
14 sensor device
140 RFID antenna (sensor)
141 detection area
15 control device
16, 16A, 16B goods deposition area
17 goods removal area
170 immovable barrier element
171 movable barrier element
172 packing trough
M1, M2 motor
P1-P3 goods feed path
W1-W4 goods

The invention claimed is:

1. A POS system arrangement, comprising:
a transport belt device with at least one belt portion which for the transport of goods present on the same can be put into a feed movement along a goods feed path, wherein the goods are separable from each other along the goods feed path by at least one goods divider,
a goods detection device for detecting goods transported by means of the transport belt device,
at least one sensor device arranged at a distance from the goods detection device along the goods feed path with a sensor and a detection area, wherein the sensor device is configured to detect by means of the sensor whether the goods divider is present in the detection area, and
a control device which is configured to control the feed movement of the belt portion of the transport belt device in dependence on the detection of the goods divider in the detection area of the sensor device.

2. The POS system arrangement according to claim 1, wherein the goods detection device is formed as portal scanner.

3. The POS system arrangement according to claim 1, wherein the sensor device is arranged before the goods detection device along the goods feed path, so that goods transported by means of the transport belt device pass the sensor device before the goods detection device.

4. The POS system arrangement according to claim 1, wherein the sensor device is configured to detect whether the goods divider is present in the detection area by reading out a machine-readable code provided on the goods divider by means of the sensor.

5. The POS system arrangement according to claim 4, wherein the machine-readable code provided on the goods divider is read out by means of an electromagnetic field generated by the sensor of the sensor device.

6. The POS system arrangement according to claim 4, wherein the machine-readable code provided on the goods divider is provided by an RFID tag and that the sensor of the sensor device is formed as RFID antenna for reading out the RFID tag of the goods divider.

7. The POS system arrangement according to claim 4, wherein the machine-readable code provided on the goods divider is formed as bar code, QR code, graphics, pattern and/or digital watermark.

8. The POS system arrangement according to claim 1, comprising several goods dividers, wherein the several goods dividers are clearly identifiable with reference to the machine-readable codes provided on the goods dividers.

9. The POS system arrangement according to claim 1, wherein the control device is configured to control the feed movement of at least one belt portion of the transport belt device arranged upstream of the goods detection device along the goods feed path in dependence on the detection of the goods divider in the detection area of the sensor device.

10. The POS system arrangement according to claim 1, comprising at least one first belt portion which is formed for the deposition of goods, and a second belt portion which is formed for the transport of the goods deposited on the first belt portion into the detection area of the goods detection device.

11. The POS system arrangement according to claim 10, wherein the control device can put the first belt portion into a feed movement with a first speed and the second belt portion into a feed movement with a second speed, wherein the second speed is greater than the first speed.

12. The POS system arrangement according to claim 10, wherein the control device is configured to reduce a speed of the feed movement of the first belt portion, while the goods divider is present in the detection area of the sensor device.

13. The POS system arrangement according to claim 10, wherein the control device is configured to stop the first belt portion, as soon as the goods divider leaves the detection area of the sensor device.

14. The POS system arrangement according to claim 10, wherein the first belt portion adjoins the second belt portion at a transition, wherein at the transition the detection area of the sensor device is arranged.

15. A method for operating a POS system arrangement, which comprises
a transport belt device with at least one belt portion which for the transport of the goods present thereon can be put into a feed movement along a goods feed path, wherein the goods along the goods feed path are separable from each other by at least one goods divider,
a goods detection device for detecting goods transported by means of the transport belt device,
at least one sensor device arranged at a distance from the goods detection device along the goods feed path with a sensor and a detection area, and
a control device,
wherein the sensor device detects by means of the sensor whether the goods divider is present in the detection area, and the control device controls the feed movement of the belt portion of the transport belt device in dependence on the detection of the goods divider in the detection area of the sensor device.

* * * * *